United States Patent [19]

Schuchardt et al.

[11] Patent Number: 5,334,358
[45] Date of Patent: Aug. 2, 1994

[54] SELF-CLEANING REACTOR/MIXER WITH LARGE USEFUL VOLUME

[75] Inventors: Heinrich Schuchardt, Krefeld; Martin Ullrich, Leverkusen, both of Fed. Rep. of Germany

[73] Assignee: Bayer Aktiengesellschaft, Fed. Rep. of Germany

[21] Appl. No.: 101,942

[22] Filed: Aug. 4, 1993

Related U.S. Application Data

[63] Continuation of Ser. No. 704,597, May 23, 1991, abandoned.

[30] Foreign Application Priority Data

Jun. 6, 1990 [DE] Fed. Rep. of Germany ....... 4018069

[51] Int. Cl.$^5$ ................................................ B01F 7/04
[52] U.S. Cl. ............................... 422/210; 422/209; 422/224; 422/225; 366/312; 366/313; 366/297; 366/300; 366/301
[58] Field of Search ............. 422/210, 209, 224, 225; 366/312, 300, 313, 301, 297

[56] References Cited

U.S. PATENT DOCUMENTS

| | | | |
|---|---|---|---|
| 3,880,407 | 4/1975 | List | 422/225 |
| 3,964,874 | 6/1976 | Maruko et al. | 366/312 X |
| 4,176,969 | 12/1979 | Wallace et al. | 366/149 |
| 4,188,131 | 2/1980 | Duguet | 366/301 |
| 4,776,703 | 10/1958 | Oda et al. | 366/301 X |
| 4,950,081 | 8/1990 | List | 366/85 |
| 5,048,971 | 9/1991 | Wall et al. | 366/85 |

FOREIGN PATENT DOCUMENTS

| | | |
|---|---|---|
| 0262594 | 9/1987 | European Pat. Off. . |
| 0329092 | 2/1989 | European Pat. Off. . |
| 2012294 | 1/1970 | Fed. Rep. of Germany . |
| 1197720 | 2/1959 | France . |
| 7721104 | 2/1979 | France . |
| WO88/04198 | 6/1988 | PCT Int'l Appl. . |

OTHER PUBLICATIONS

Patent Abstracts of Japan, vol. 13, No. 29 (C 562) [3377] Jan. 23, 1989; & JP-A-63 232 828 (Mitsubishi Sep. 28, 1988).
Patent Abstracts of Japan, vol. 11, No. 80 (C-409) [2527] Mar. 11, 1987; JA-A61 234 917 (Mitsubishi) Oct. 20, 1986.

Primary Examiner—James C. Housel
Assistant Examiner—Long V. Le
Attorney, Agent, or Firm—Connolly & Hutz

[57] ABSTRACT

Disc reactors with large free useful volume which clean themselves kinematically, consisting of two or more parallel shafts, rotating in the same or opposite directions, on which are located axially staggered, circular discs with scrapers distributed over their periphery, and an enclosing casing.

11 Claims, 10 Drawing Sheets

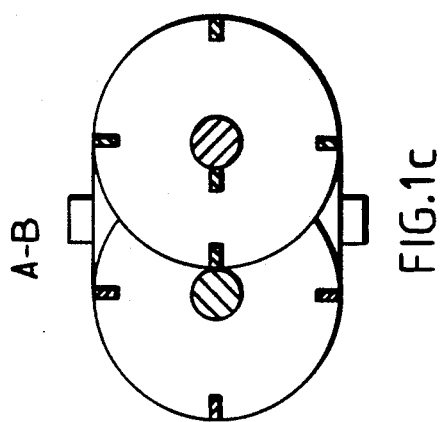
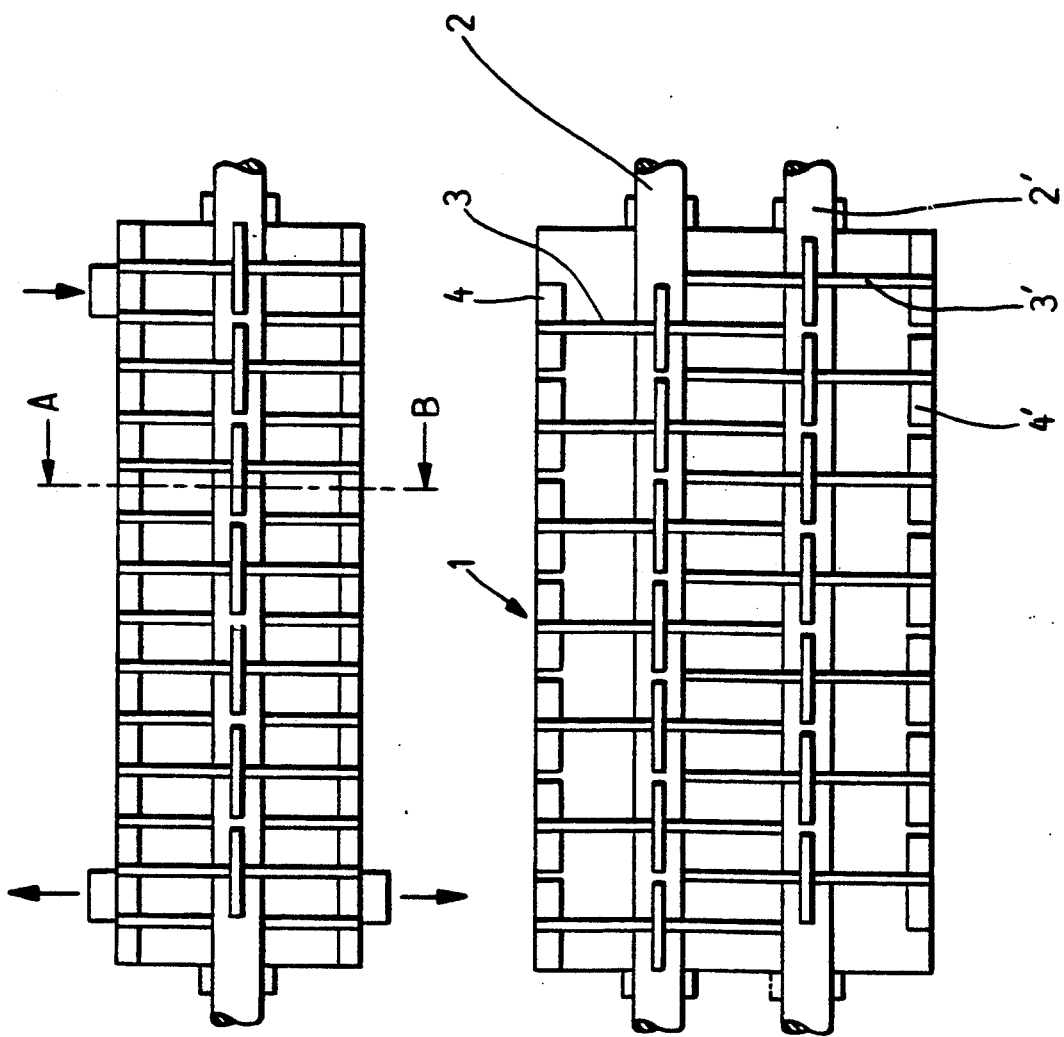
FIG.1c
FIG.1a
FIG.1b

SELF-CLEANING REACTOR/MIXER WITH LARGE USEFUL VOLUME

CROSS-REFERENCE TO RELATED APPLICATION

The present application is a continuation of application Ser. No. 07/704,597, filed May 23, 1991, now abandoned.

The invention relates to disc reactors with large free useful volume which clean themselves kinematically, consisting of two or more parallel shafts, rotating in the same or opposite directions, on which are located axially staggered and not necessarily circular discs with scrapers distributed over their periphery, and an enclosing casing.

The invention is directed to apparatuses for the process-engineering treatment of fluids and cohesive bulk materials. The apparatuses are largely self-cleaning kinematically and have a large free useful volume.

PRIOR ART

During the production and processing of plastics among other things, high-viscosity liquids must be treated by process engineering. Apparatuses are required in particular for mixing and evaporation. These must have a good mixing action and in the case of evaporation bring about a rapid renewal of the free surfaces.

Deposits of product on the walls of such mixers can lead to interference with the process. In the deposits undesirable side-reactions are favoured because of the considerably increased residence time. This leads to contamination of the product. Deposits of product on the walls can be avoided by kinematic self-cleaning of the mixer. The object of self-cleaning is achieved for example by known two-shaft extruders rotating in the same and opposite directions, and also by single-shaft kneaders with axially oscillating motion. Their structural shapes have in common a small free useful volume. Only a small part of the total volume of such an extruder is available for the product.

A large free volume is, however, to be aimed at with a view to the minimizing of apparatus costs.

A large free volume is achieved by so-called disc reactors. In the single-shaft model the rotor of the disc reactor consists of a shaft on which are arranged axially staggered discs, which have scraper elements on their periphery which clean the greatest part of the casing wall. Typically, stationary scrapers are arranged on the casing wall, which are intended to clean the shaft and the discs.

The basic construction of a two-shaft disc reactor is shown in FIG. 1. On the shafts, discs are arranged alternately in the axial direction. These have scraper elements on their periphery. These are intended to clean the casing wall, as well as the shaft, the discs and also the scraper elements of the other shaft.

The known types of disc reactors have in common a degree of cleaning (kinematically cleaned surface/total surface of the apparatus contacted by the product) of usually less than 70%. This is caused by the fact that in the one-shaft case the scraper elements are not cleaned all round and in the two-shaft case the discs also are only cleaned to a limited degree.

An effective mixer which has both a high degree of self-cleaning (distinctly greater than 70%) and a large free useful volume is not known.

The object of the invention is the provision of an apparatus that fulfills both conditions.

The problem is solved by a multi-shaft mixer (see FIG. 1) having on each shaft 2 on staggered discs 3 scraper elements 4, which are so formed that they clean the wall of the mixing chamber 1, the shafts 2 and the disc surfaces as well as each other mutually.

The contents of the invention are two independent solutions, for rotation in the same direction on the one hand and for rotation in the opposite direction on the other.

Subject matter of the invention is a disc reactor consisting of two or more parallel shafts rotating in the same direction, on which are located axially staggered, not necessarily circular, discs with scraper elements distributed on their periphery, and an enclosing casing, in which the scraper elements are in the first place bounded by surfaces whose normal vectors in the radial section have a component away from the axis of rotation. These are convex. They either touch surfaces on the other rotor, which are likewise convex and have a component of the normal vector away from the axis of rotation, and are thereby kinematically cleaned, or they touch the casing wall.

Touch is understood to mean the closest possible approach of the reactor parts mentioned which is achievable, taking into account the manufacturing tolerances, so that the parts mentioned can slide past each other without jamming of the rotation of the shafts.

In the second place the scraper elements are bounded by surfaces whose normal vectors have a component towards the axis of rotation. Each concave surface corresponds to a convex surface on the other rotor, which likewise has a component of the normal vector towards the axis of rotation.

At a radius of curvature of zero, each of the convex surfaces can degenerate to an edge.

Preferred is an embodiment of the reactor with rotationally symmetrical rotors, in which the more slowly rotating rotor is constructed with n-fold symmetry, with $n>4$.

From the use of extruders with two shafts, rotating in the same direction at equal speeds, it is known that a cleaning of surfaces whose normal vector has a component away from the axis of rotation is just possible if in a radial section at the point of contact the sum of the radii $r_1 + r_2$ of the surfaces touching each other is equal to the distance between axes a (see FIG. 2).

A radius of zero is here to be regarded as a special case: then one is not dealing with a surface, but with an edge.

For surfaces whose normal vector has a component towards the axis of rotation, a special solution is described in the European Patent Laid-open Print 269913. Surfaces with a normal component towards the axis of rotation are either flat and are touched by just such a flat face and thereby cleaned, or concave with a radius of curvature equal to the distance between the axes and are touched by an edge and thereby cleaned. In the mixing apparatus according to EP-OS 269 913 the discs with the scrapers are not arranged axially staggered on the shafts. A generalized solution is not supplied.

Cleaning is possbile here if in a radial section at the point of contact the difference between the radii $r_2 - r_1$ of the surfaces touching each other is equal to the distance between the shafts a and the less curved surface is concave (see FIG. 3).

The solutions described in EP 269913 here represent special cases. For an infinite radius of curvature the surface degenerates to a plane. Then the opposing surface is also plane. Another special case arises if the radius of the convex surfaces is zero. An edge is obtained.

Also subject matter of the invention accordingly is a disc reactor consisting of two or more parallel shafts, rotating in the same direction at the same speed, on which are located, axially staggered, not necessarily circular discs, with scrapers distributed on their periphery, and an enclosing casing, in which two surfaces, each of whose normal vectors in a radial section has a component away from the axis of rotation concerned, touch each other, when the sum of the radii of curvature at the point of contact equals the distance between the axes. (In the case of infinitely small radii of curvature, edges are obtained), and in which in a radial section two surfaces, at least one of which has a component towards the axis of rotation concerned, touch each other, when the difference of the radii of curvature at the point of contact equals the distance between the axes and the less curved surface is concave. (In the case of infinite radii of curvature, planes are the result).

Preferred is an embodiment of the reactor according to the invention in which the scraper elements are distributed with n-fold symmetry around the rotor axis, where n is a number greater than or equal to 2, preferably greater than 4, especially preferably 5.

It is known that in the system with rotation in opposite directions, in the radial section a point on one rotor describes a cycloidal curve in the reference system of the other rotor.

From this it follows that a scraper element of a disc reactor is just completely cleaned kinematically when its periphery is bounded by the cycloidal curves which the peripheral points of the scraper elements of the other rotor describe.

Corresponding to the shape of the cycloidal curves, all surfaces facing outwards are convex, while the surfaces with a normal component towards the axis of rotation are concave.

The inventive problem was to discover a suitable arrangement of the scraper elements which enables all scraper elements to be cleaned on all sides.

The inventive solution consists in so arranging all scraper elements that their principal dimension makes an angle with the radius, and all scraper elements of one rotor deliver outwards and all of the other rotor inwards.

As a result it becomes possible that on entering the zone of engagement of the other rotor, the narrow sides of one scraper element clean the long sides of two scraper elements of the other rotor, while on leaving, the long sides of two scraper elements of the one rotor clean the narrow sides of two scraper elements of the other rotor.

If only outwards-delivering elements were arranged on one rotor and only inwards-delivering elements on the other rotor, it would be expected that the torque and consequently also the angle of twist of the shafts would be different over their axial length and consequently different clearances could arise over the length, to the extent of jamming.

This can be prevented if on each shaft elements delivering outwards and elements delivering inwards alternate in the axial direction.

In both cases (rotation in the same and opposite directions), an axial delivery can be achieved by making the scrapers spirally twisted in their axial dimension.

Subject matter of the invention also is a multi-shaft disc reactor consisting of two or more parallel shafts rotating in opposite directions, on which are located axially staggered, not necessarily circular, discs with scraper elements distributed around the periphery, and an enclosing casing, characterized in that in a radial section the principal dimension of the scraper elements makes an angle with the radius, and in that in radial section all scrapers of one rotor deliver outwards, while all scrapers of a rotor in engagement and rotating in the opposite direction deliver inwards, and in that in a radial section all bounding surfaces of a scraper whose normal vector has a component away from the axis of rotation are convex, while all surfaces of a scraper whose normal vector has a component towards the axis of rotation are concave.

In a preferred embodiment of the disc reactor with shafts rotating in different directions, on one rotor scrapers delivering outwards and scrapers delivering inwards alternate in the axial direction.

In the embodiments of the invention, the disc reactor with shafts rotating in opposite directions and the disc reactor with shafts rotating in the same direction, the mixing action of the reactors can be increased by fitting additional scraper elements on the discs on one or more radii smaller than the disc radius. For the disc reactors according to the invention, the scraper elements can be arranged on the discs staggered by an angle, viewed in the axial direction, in order to achieve an evening out of the driving torques.

BRIEF DESCRIPTION OF THE DRAWINGS

Next the description of the invention is explained in detail with the aid of the attached diagrams.

These show.

DESCRIPTION OF THE PREFERRED EMBODIMENTS

EXAMPLES

Figure 1D:
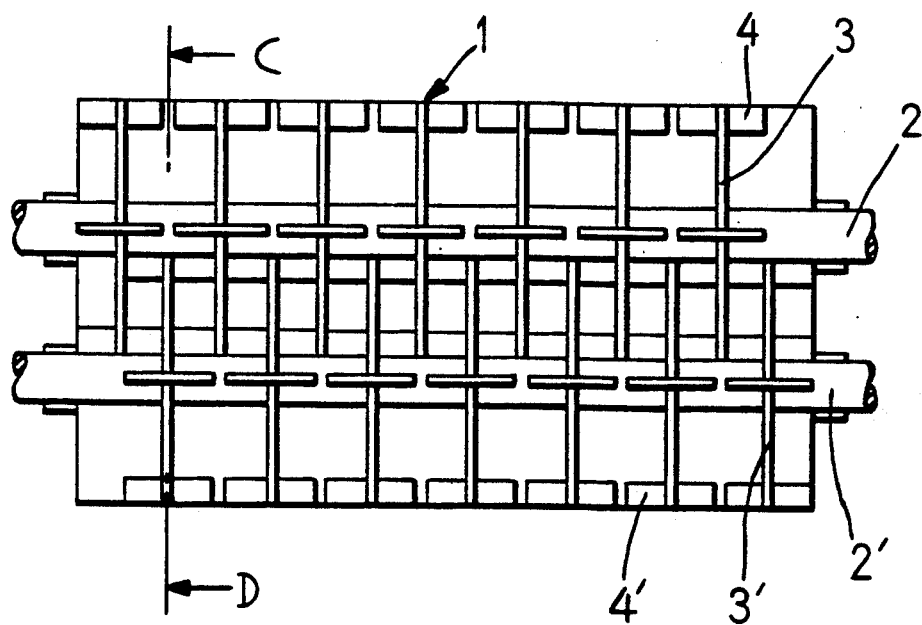
FIGS. 1(*a–d*): Basic construction of a known two-shaft disc reactor.
Figure 2:
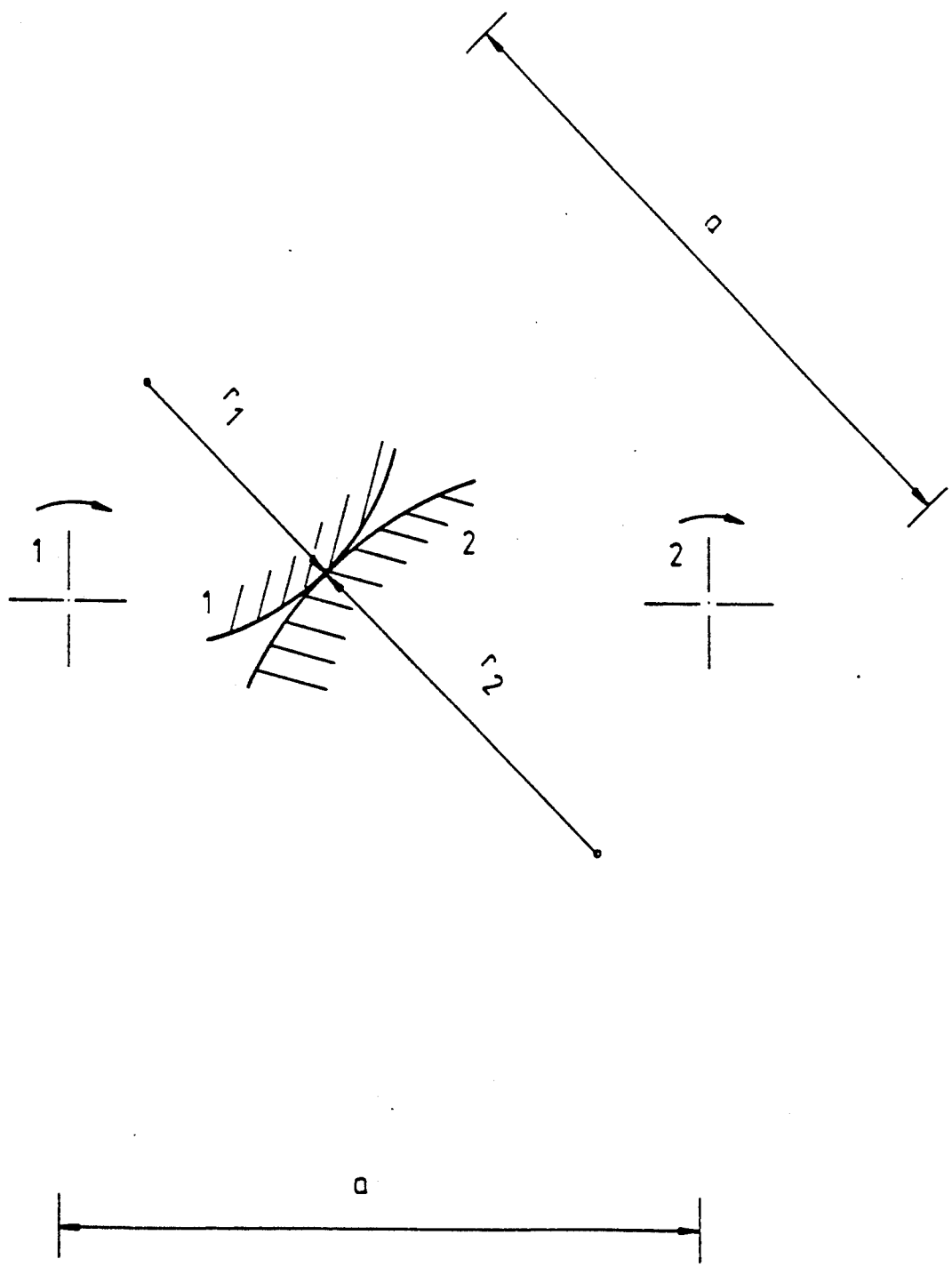
FIG. 2: Basic representation of the geometric condition for the cleaning of convex surfaces in contact with each other in two-shaft disc reactors with axes rotating in the same direction.
Figure 3:
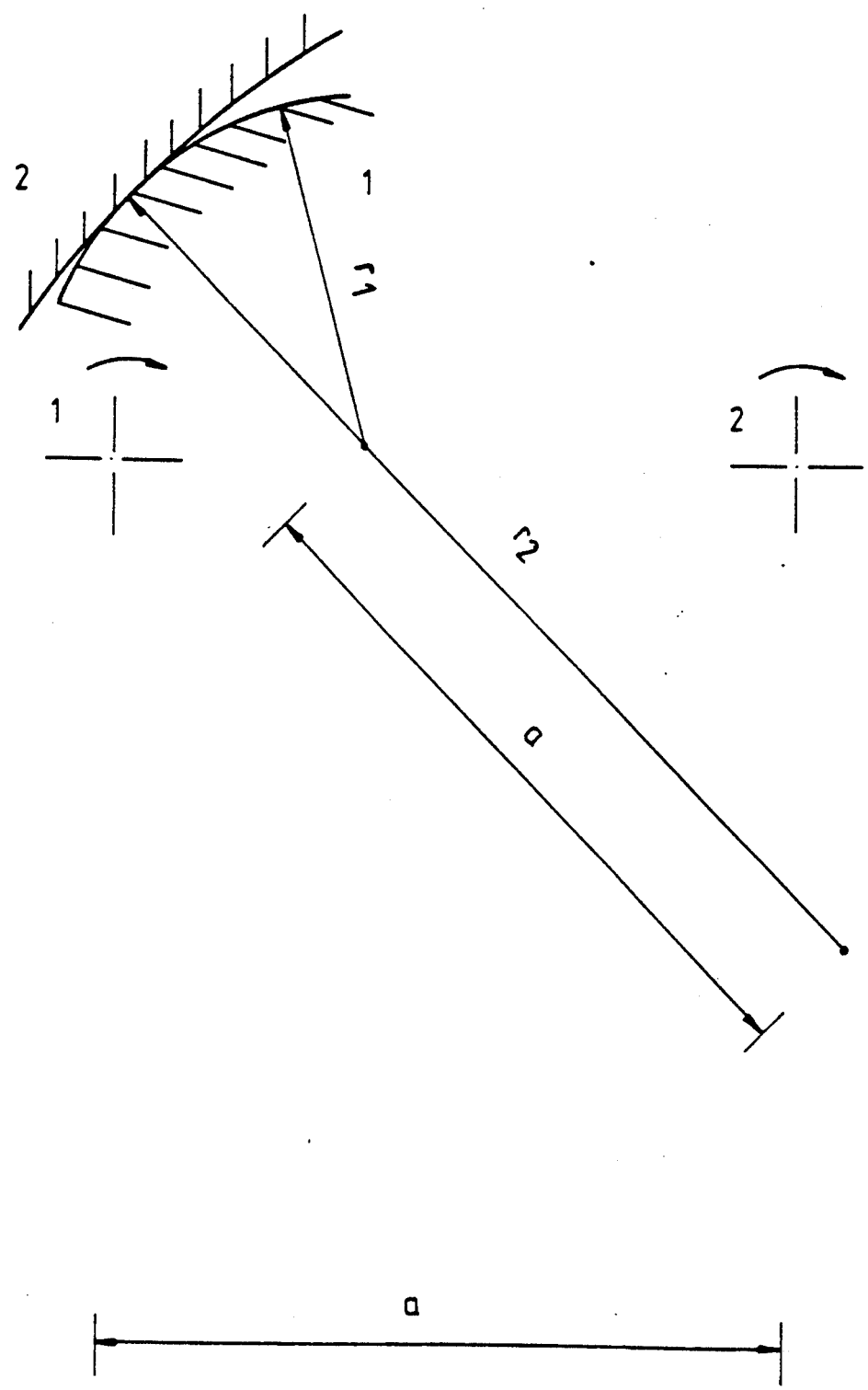
FIG. 3: Basic representation of the geometric condition for the cleaning of a concave and a convex surface which touch each other in two-shaft disc reactors with axes rotating in the same direction.

FIG. 1 shows the basic construction of a known multi-shaft disc reactor.

For the understanding of the kinematics, radial sections through the scraper elements are of prime importance. Accordingly in FIGS. 4 and following, in each case a section corresponding to the section A-B of FIG. 1 is shown.

Example 1

Corotating disc reactor with rotation of the two axes at the same speed.

Figure 4:
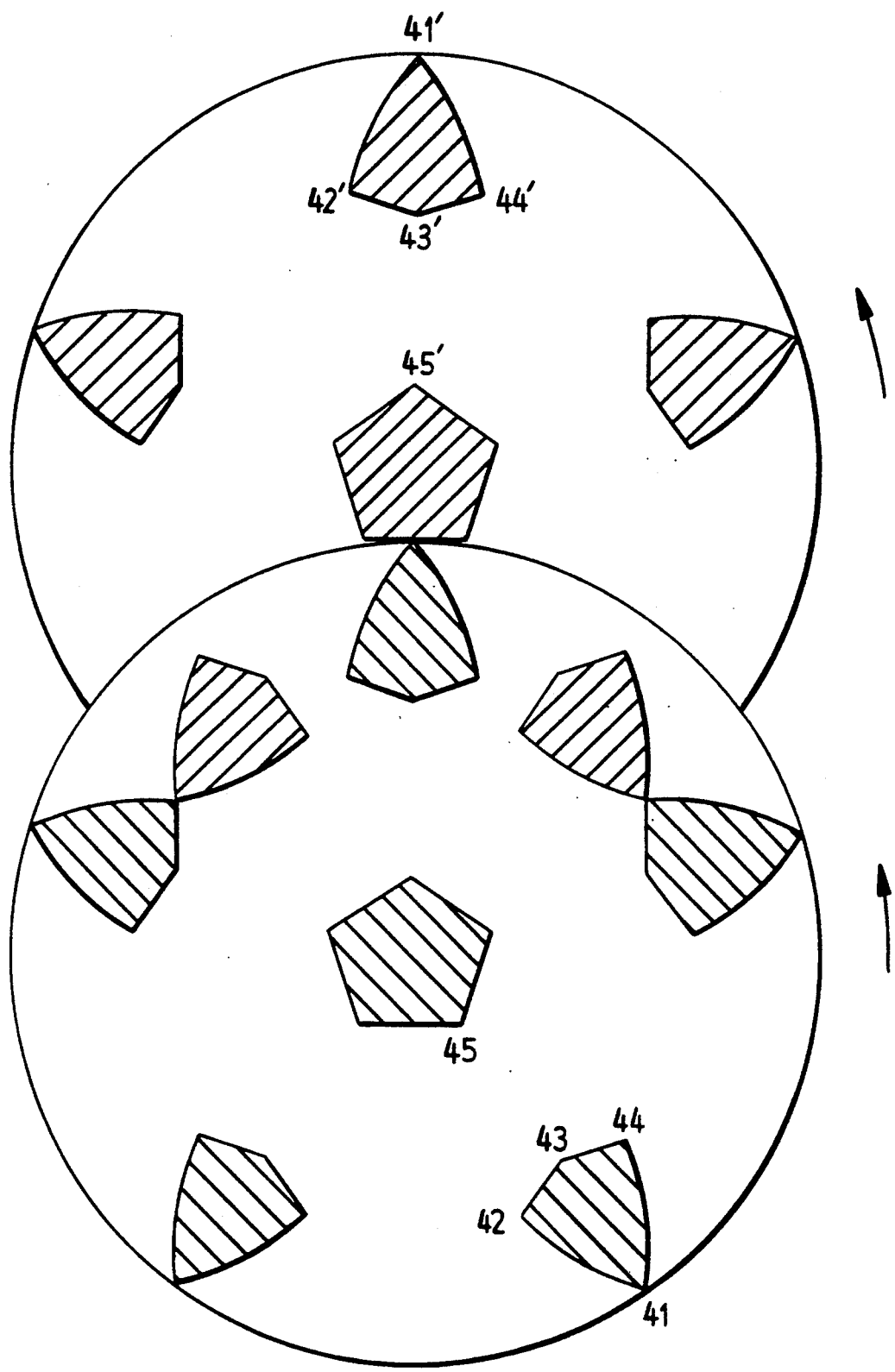
FIG. 4: Radial section corresponding to a section A–B from FIG. 1 through a disc reactor according to the invention with rotors turning in the same direction at the same speed and 5 scraper elements with flat internal surfaces on each disc face.

FIG. 4 shows a possible arrangement of the scraper elements 4 and 4' in FIG. 1.

On the disc 3 in FIG. 1, 5 scraper elements 4 are arranged with rotational symmetry. Because of the rotational symmetry, the driving torques arising are largely evened out. The number of 5 scraper elements 4 makes possible a small shaft diameter and consequently a large free volume. A smaller shaft diameter can only be achieved with a degree of symmetry of 8 or more. With more than 5 scraper elements a badly mixed zone arises in the middle between the rotors. Here an improvement can be reached only through an additional ring of scrapers 4 on a smaller radius.

The cleaning of the outwardly-lying surfaces 41-42, 44-41, 45—45 is carried out by edges 41' of the scrapers 4' of the other rotor. Consequently, since the sum of the radii of curvature must equal the distance between the shafts, the radius of the cleaned surface must be the distance between the shafts.

The cleaning of the inwardly-lying surfaces 42-43, 43-44 is carried out by flat surfaces 42'-43', 43'-44' of the scrapers 4' of the other rotor. Consequently, since the difference between the radii of curvature must equal the distance between the shafts and the radius of curvature of a plane is infinite, the opposing surfaces 42-43, 43-44 must also be flat.

The edges 41,41' likewise clean the casing wall 1 in FIG. 1.

Figure 5:
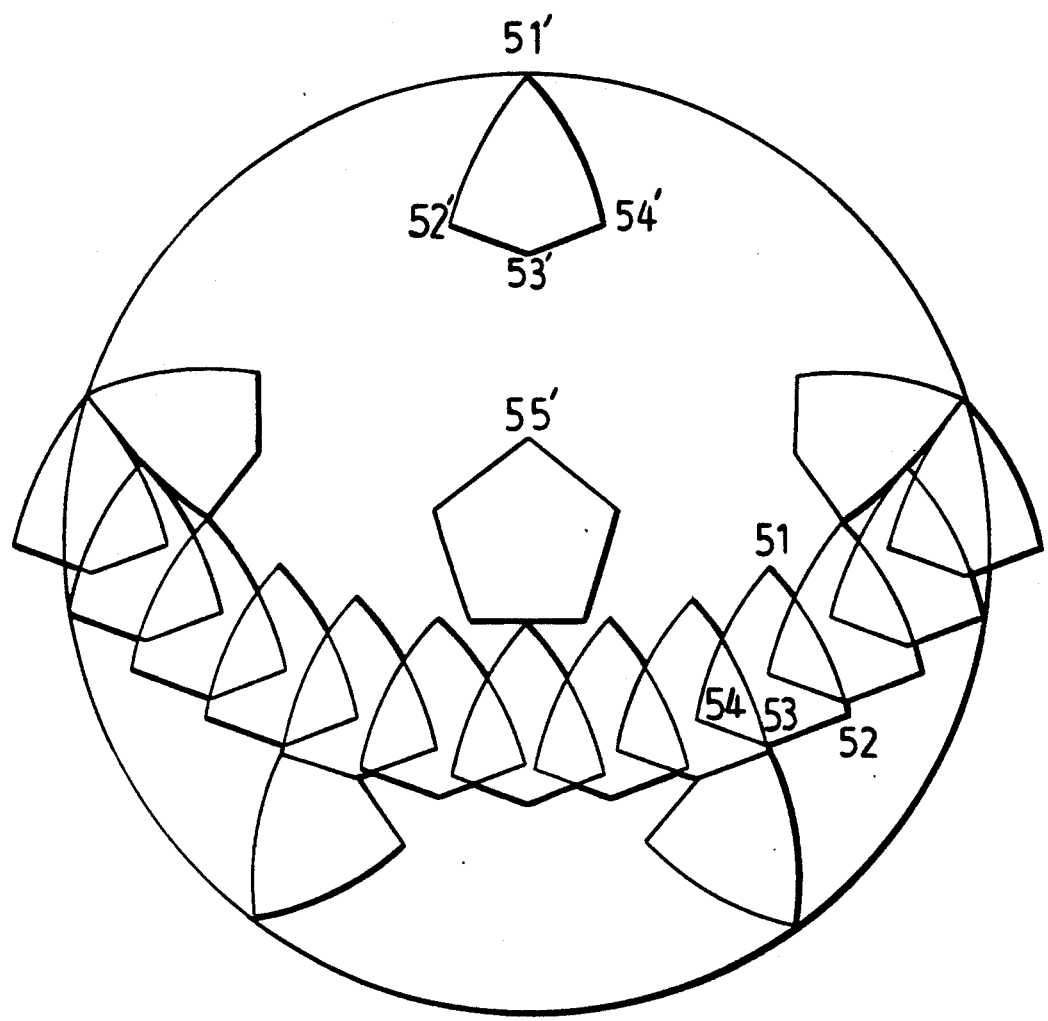
FIG. 5: Relative motion of a scraper 51-52-53-54 of the one rotor of a disc reactor as in FIG. 4 with respect to another rotor as stroboscopic photograph.

FIG. 5 shows the relative motion of a scraper 51-5-2-53-54 with respect to the other rotor as stroboscopic photograph.

It can be seen that the faces of the discs 3 in FIG. 1, if these are not circular but drawn in between the scrapers to the middle, are completely cleaned.

The driving torques show peaks when the internal surfaces 52-53, 53-54 touch. An evening out is attainable if the scraper elements 4 and 4' on subsequent discs 3 and 3' are arranged rotated in respect to another.

Example 2

Figure 6:
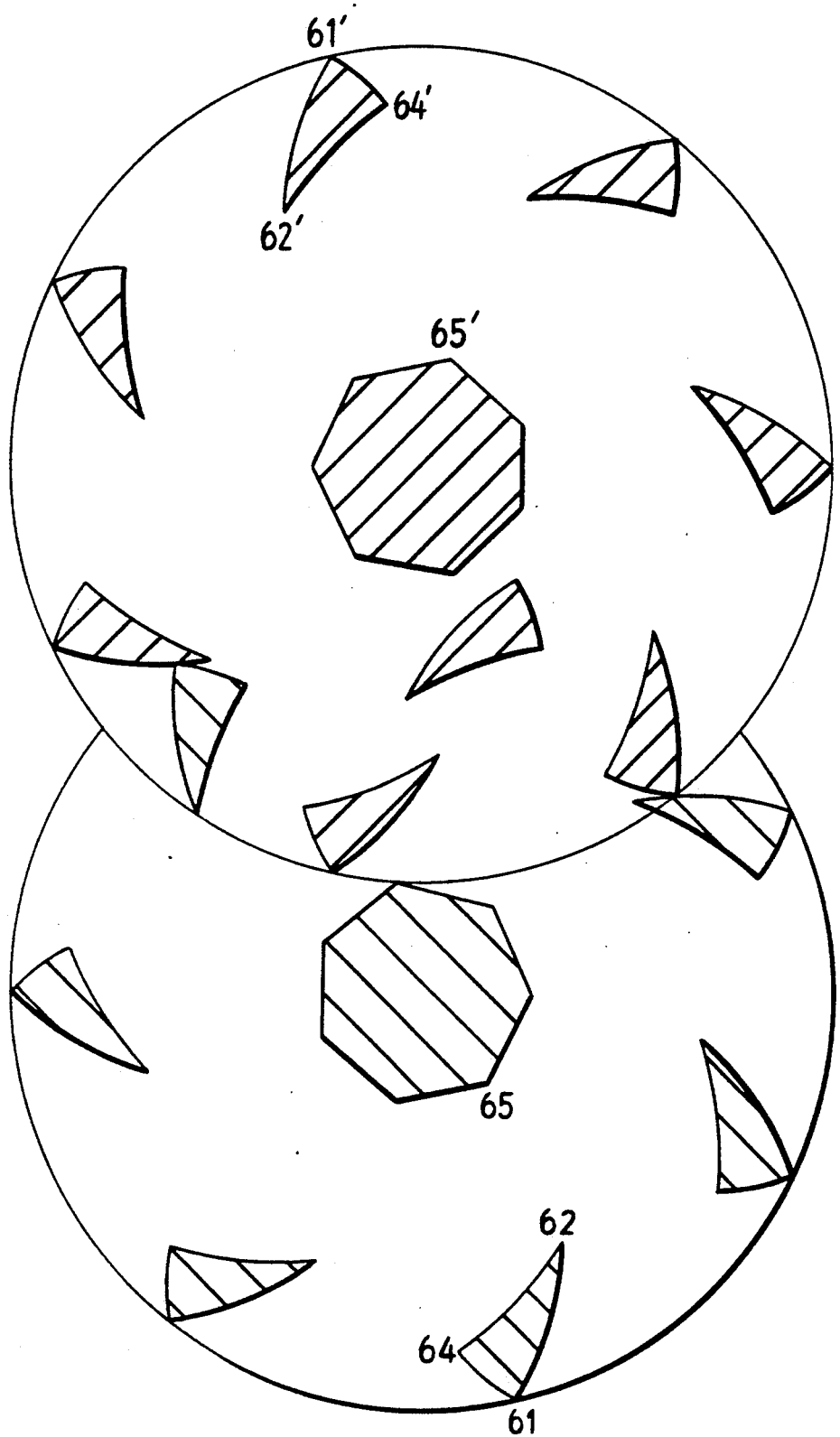
FIG. 6: Radial section through a disc reactor according to the invention with shafts turning in the same direction at the same speed and 7 scrapers with concave-internal surfaces on each disc face.

FIG. 6 shows the radial section through a disc reactor with shafts rotating in the same direction at the same speed, in which 7 scraper elements are arranged with rotational symmetry on the disc. As distinct from Example 1 the convex surfaces whose normal vector has a component to the axis of rotation are here contracted to an edge 62. Since the difference between the radii of curvature must equal the distance between the shafts, the radius of the concave internal surface is accordingly equal to the distance between the shafts. The driving torque peaks are thereby considerably reduced, compared with Example 1. The cleaning of the outwardly-lying surfaces 61-62, 64-61, 65—65 is carried out by the edges 61' of the scrapers of the other rotor. The cleaning of the inwardly-lying surfaces 62-64 is carried out by the edges 62' of the scrapers of the other rotor.

Also in this example the edges 61 and 61' clean the casing wall.

Example 3

Rotation in Opposite Directions

Figure 7:
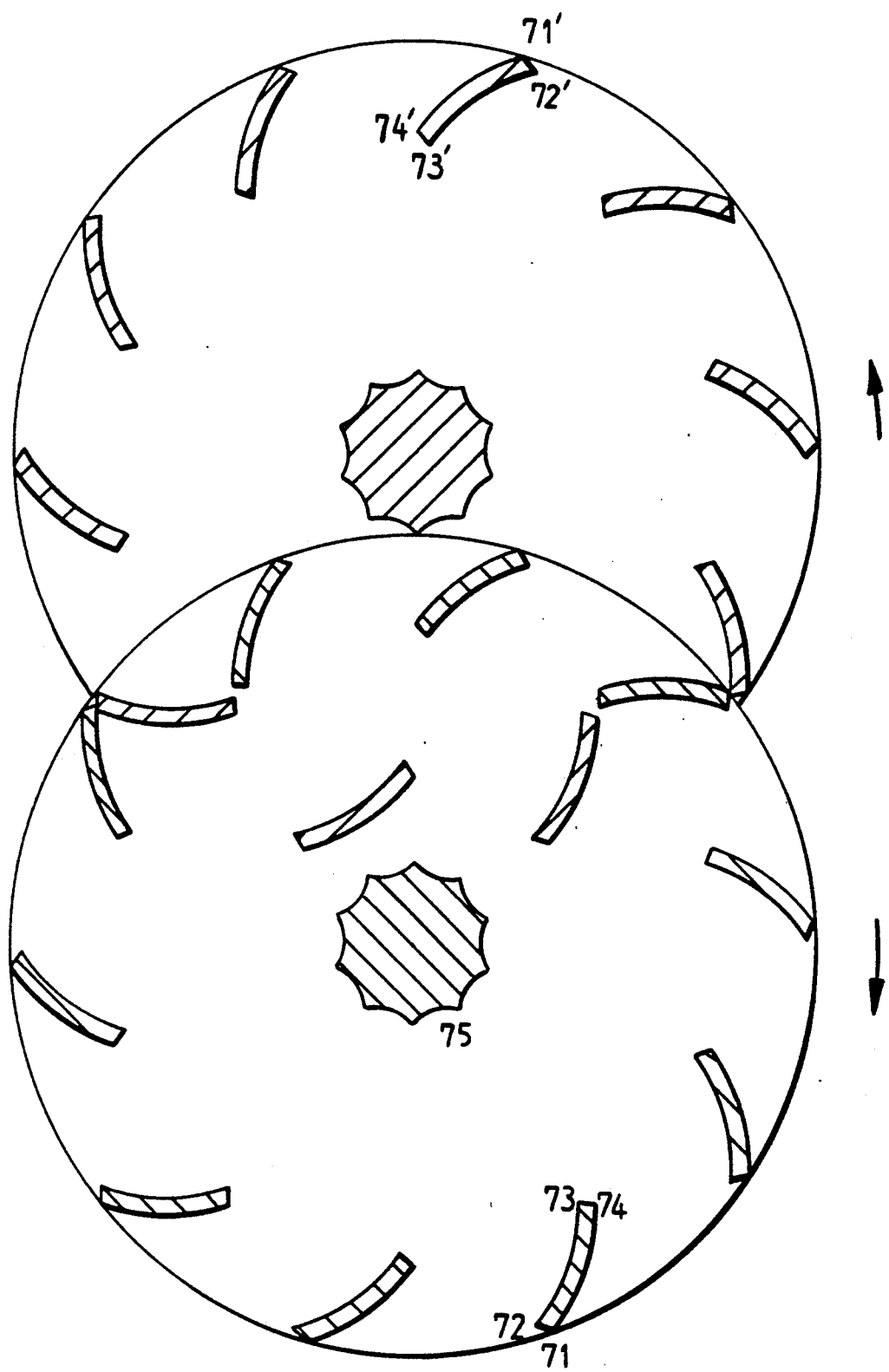
FIG. 7: Radial section through a disc reactor according to the invention with shafts turning in the opposite direction at the same speed and 10 scrapers on each disc face.

FIG. 7 shows a possible arrangement of scraper elements 4 and 4' in FIG. 1 for a disc reactor with shafts rotating in opposite directions at the same speed.

To even out the driving torques the rotors are constructed with rotational symmetry. A minimizing of the driving torques and of the uncleaned disc faces is achieved by scraper elements which are as narrow as possible.

The cleaning of the surfaces 71-72 is carried out by surfaces 72'-73', the cleaning of the surfaces 72-73 by the surfaces 71'-72', that of the surfaces 73-74 by the surfaces 74'-71', that of the surfaces 74-71 by the surfaces 73'-74', and that of the surfaces 75—75 by the edges 71'. The edges 71 and 71' likewise clean the casing wall 1 in FIG. 1.

Figure 8:
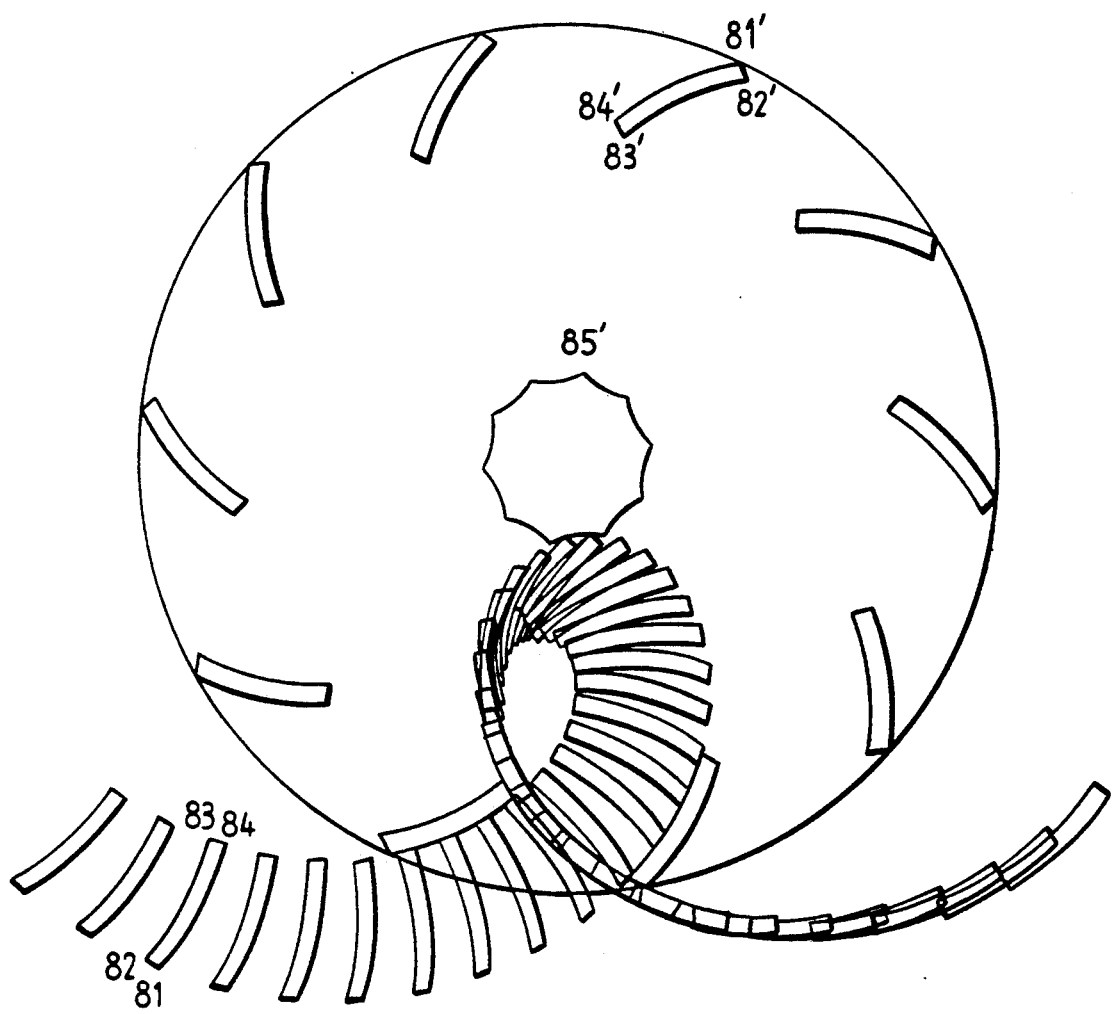
FIG. 8: Relative motion of a scraper 81-82-83-84 of the one rotor with respect to another rotor of a disc reactor as in FIG. 7 as stroboscopic photograph.
Figure 9:
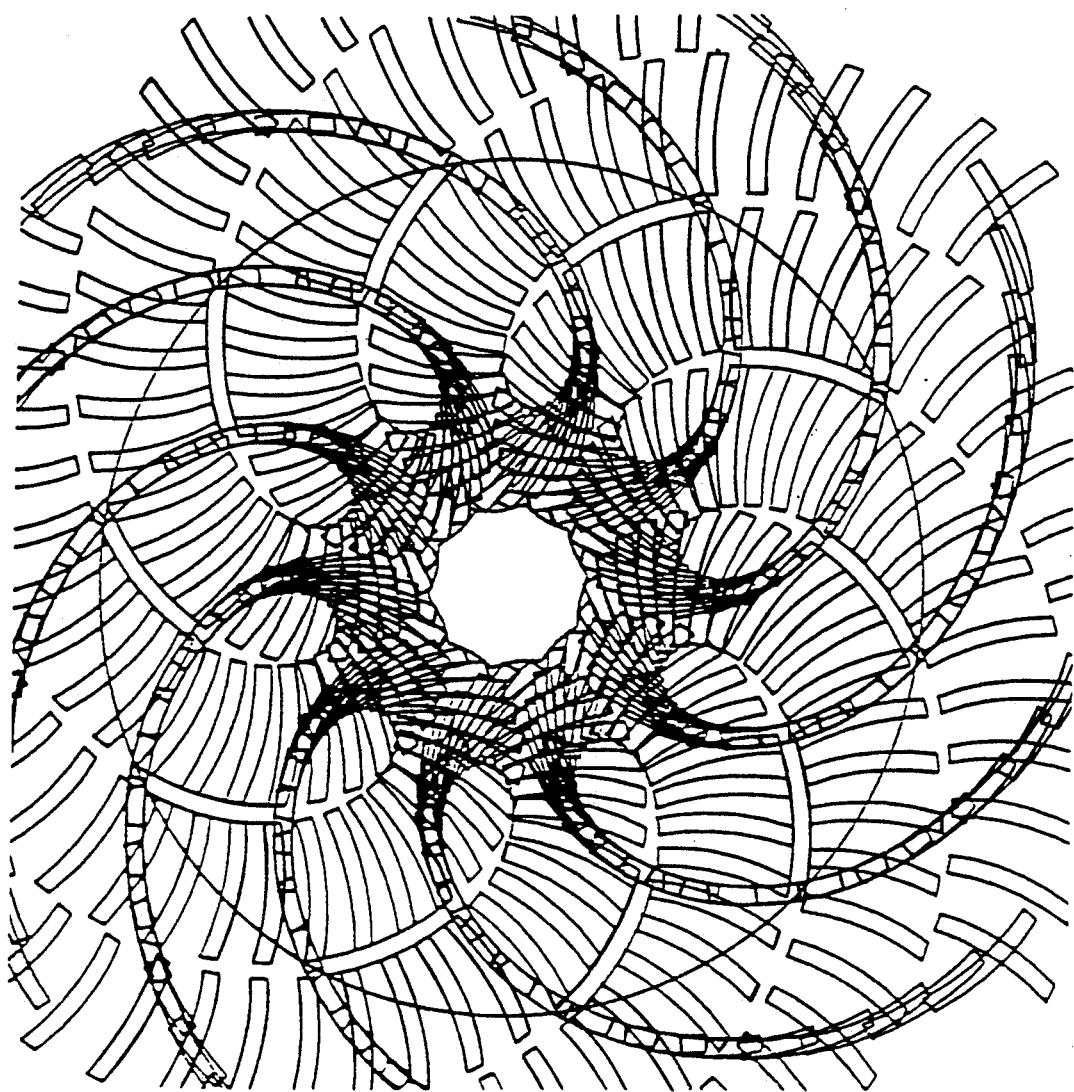
FIG. 9: Relative motion of all scrapers of a rotor with respect to another rotor of a disc reactor as in FIG. 7 as stroboscopic photograph.

FIG. 8 shows the relative motion of a scraper 81-8-2-83-84 with respect to the other rotor in instantaneous photographs during a half-revolution. In FIG. 9 are drawn the relative motions of all scrapers 4 of a rotor 2 with respect to the other rotor 2'. It can be seen that the surfaces of the discs 3 in FIG. 1 are almost completely cleaned.

We claim:

1. A disc reactor having a useful free volume comprising at least two parallel shafts rotating in the same direction, axially staggered circular discs secured to the shafts, each circular disc having a peripheral portion, a plurality of spaced apart scraper elements attached to the circular discs at the peripheral portions thereof, and a casing enclosing the shafts and the axially staggered circular discs secured thereto, each of the scraper elements on the discs of one of the parallel shafts having a surrounding surface that cleans the surrounding surface of the scraper elements on an adjacent disc on the other one of the parallel shafts, each surrounding surface of the scraper elements having an outwardly extending convex surface portion cleaned by the convex surface portion of the scraper elements on an adjacent disc on the other shaft or by the casing, and each surrounding surface of the scraper elements including an inwardly extending concave portion cleaned by the scraper elements on an adjacent disc on the other shaft.

2. A disc reactor as in claim 1 wherein the scraper elements are spirally arranged in an axial direction.

3. A disc reactor as in claim 1 including additional spaced apart scraper elements attached to the discs inwardly of the peripheral portions thereof.

4. A disc reactor as in claim 1 wherein one of the two parallel shafts rotates slower than the other, the slower rotating shaft having an n-fold rotational symmetry, where n is greater than 4.

5. A disc reactor having a useful free volume comprising at least two parallel shafts rotating in the same direction and at the same speed, axially staggered circular discs secured to the shafts, each circular disc having a peripheral portion, a plurality of spaced apart scraper elements attached to the circular discs at the peripheral portions thereof, and a casing enclosing the shafts and the axially staggered discs secured thereto, each of the scraper elements on the discs of one of the parallel shafts having a surrounding surface that touches the surrounding surface of the scrapers on an adjacent disc on the other one of the parallel shafts, each surrounding surface at the point of touching having a radius of curvature and the sum of the radii of curvature on one disc being equal to a distance between the shafts, and each surrounding surface of the scraper elements including an inwardly extending concave portion.

6. A disc reactor as in claim 5 wherein the scraper elements are distributed around the peripheral portions of the discs with an n-fold symmetry, where n is equal to or greater than 2.

7. A disc reactor as in claim 5 wherein n is greater than 4.

8. A disc reactor as in claim 5 wherein n is equal to 5.

9. A disc reactor as in claim 5 wherein the scraper elements are spirally arranged in an axial direction.

10. A disc reactor as in claim 5 including additional spaced apart scraper elements attached to the discs inwardly of the peripheral portions thereof.

11. A disc reactor having a useful free volume comprising at least two parallel shafts rotating in opposite directions, axially staggered circular discs secured to the shafts, each circular disc having a peripheral portion, a plurality of equally spaced apart scraper elements attached to the circular discs at the peripheral portions thereof, and a casing enclosing the shafts and the axially staggered circular discs secured thereto, each of the scraper elements having an outwardly facing convex surface portion and an inwardly facing concave surface portion with both surface portions positioned at an angle to the radius of the disc on which the scraper elements are attached, the convex surface portions on one disc facing the direction of rotation of the disc to which they are attached and the concave surface portions of an adjacent disc facing the direction of rotation of the adjacent disc whereby the concave surface portions on one disc are scraped in an inward direction by scrapers of the adjacent disc while the concave surface portions of the adjacent disc are scraped in an outward direction by scrapers on the other disc.

* * * * *